Figure 1:
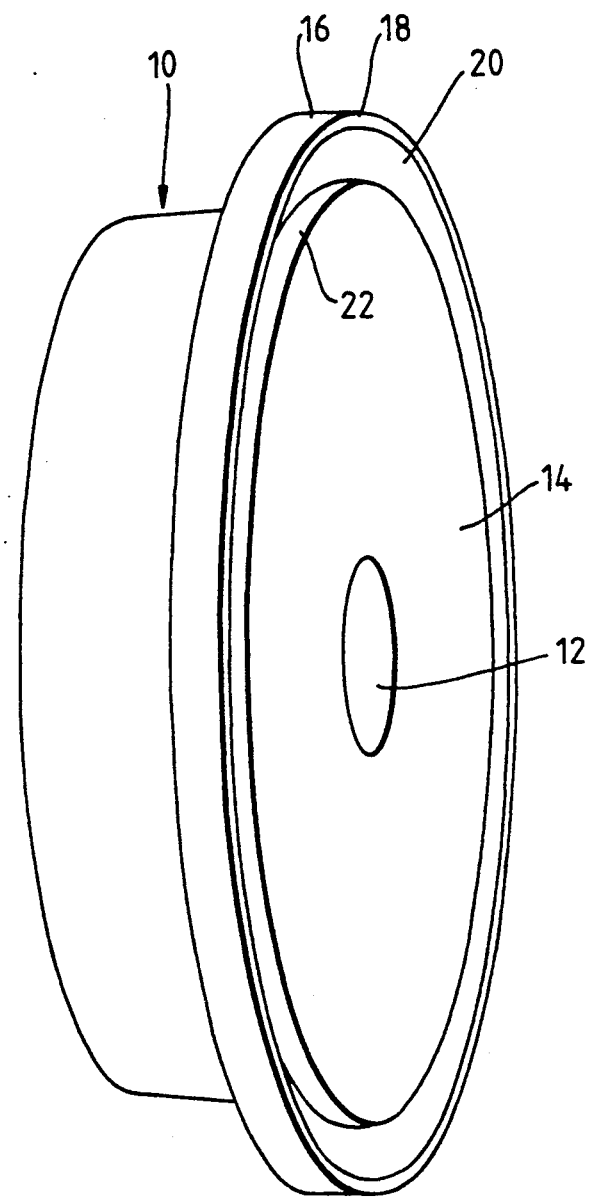

United States Patent [19]

Benn et al.

[11] Patent Number: 5,297,723
[45] Date of Patent: Mar. 29, 1994

[54] DIFFUSION BONDING TURBINE FAN DISC

[75] Inventors: Bryan L. Benn, Bristol; James E. Boardman, Colne; Arnold J. S. Pratt, Etwall; Anthony L. Pratt, Bristol, all of England

[73] Assignee: Rolls-Royce plc, London, England

[21] Appl. No.: 44,109

[22] Filed: Apr. 9, 1993

Related U.S. Application Data

[63] Continuation of Ser. No. 909,768, Jul. 7, 1992, abandoned.

[30] Foreign Application Priority Data

Jul. 11, 1991 [GB] United Kingdom ............ 9114999.7

[51] Int. Cl.⁵ .................... B23K 20/00; B23K 20/24
[52] U.S. Cl. ................................ 228/186; 228/193; 29/889
[58] Field of Search .............. 29/889, 889.1, 889.2; 228/193, 186, 221, 246

[56] References Cited

U.S. PATENT DOCUMENTS

| | | | |
|---|---|---|---|
| 4,152,816 | 5/1979 | Ewing et al. | 29/889.2 |
| 4,581,300 | 4/1986 | Hoppin, III et al. | 228/193 X |
| 4,787,821 | 11/1988 | Cruse et al. | 414/185 |
| 5,009,359 | 4/1991 | Stover et al. | 228/193 X |
| 5,161,950 | 11/1992 | Krueger et al. | 29/889 X |

FOREIGN PATENT DOCUMENTS

| | | |
|---|---|---|
| 0042744 | 12/1981 | European Pat. Off. |
| 0398134 | 11/1990 | European Pat. Off. |
| 2059819A | 4/1981 | United Kingdom |
| 2193125B | 2/1988 | United Kingdom |

Primary Examiner—Paula A. Bradley
Assistant Examiner—Jeanne M. Elpel
Attorney, Agent, or Firm—Oliff & Berridge

[57] ABSTRACT

A method of making a titanium fan disc for a gas turbine engine comprises the steps of providing a pair of identical forged titanium cylinders each having a central bore and a flat end surface at right angles to its central axis, preparing the flat end surface of each cylinder to a high degree of smoothness, abutting the prepared surfaces of the cylinders one against the other in axial alignment, removing air from between said surfaces, and diffusion bonding the cylinders end-to-end by hot isostatic pressing to form the disc.

5 Claims, 3 Drawing Sheets

BOND INTERFACE

BOND INTERFACE

DIFFUSION BONDING TURBINE FAN DISC

This is a continuation of application Ser. No. 07/909,768 filed Jul. 7, 1992, now abandoned.

This invention concerns improvements in or relating to bonding components by means of a diffusion bonding process.

It is known in the gas turbine manufacturing industry to make titanium fan discs for use in aircraft from solid titanium forgings.

Whereas there are no great technical problems in forging fan discs in one-piece form for relatively small gas turbine engines it becomes progressively more difficult not only to make larger single piece titanium forgings in one piece, but also to test them for defects. Such larger single piece forgings will typically be used for fan discs on engines for larger commercial aircraft. A defect in a forging will make it necessary to scrap the entire fan disc, and if the fan disc is large this will represent a significant unwanted production cost. A small disc also gives improved control over grain flow.

In its most general aspect the present invention teaches a method of making a fan disc for a gas turbine engine by welding together a number of smaller titanium forgings. It is more economic to make a large fan disc by this method because large forgings are more likely to have defects than smaller forgings, large forgings will need large and expensive forging machinery, it is easier to machine and handle a small forging, easier to check a small forging for defects, and less expensive to scrap a defective small forging than it is with a large one.

In the context of the invention "titanium" includes not only pure or substantially pure titanium metal but alloys of which titanium is the major constituent or one of the major constituents.

Within the method of the invention a number of titanium diaphragms, including drive arms, may be inertia bonded together to form a single fan disc assembly. This will enable individual diaphragms to be manufactured from simple rectilinear forged cylinders with a central bore, which will allow ultrasonic inspection to be easily carried out prior to the diaphragms being joined. However, inertia bonding of large diaphragms requires the use of large expensive inertia bonding machinery. A less expensive alternative to an inertia bonding in this context is HIP ("hot isostatic pressing") diffusion bonding.

According to a first aspect of the present invention there is provided a method of making a titanium fan disc for a gas turbine engine, the method comprising the steps of providing at least first and second forged titanium cylinders each having a flat end surface at right angles to the central axis of the cylinder, preparing a said flat end surface of each cylinder to a high degree of smoothness, abutting the prepared surfaces of the cylinders one against the other in axial alignment, removing air from between said surfaces, and diffusion bonding the cylinders end-to-end by hot isostatic pressing to form the disc.

Each cylinder is preferably provided with an axial bore.

Preferably the method comprises welding the cylinders together, first at their central bores by inert gas welding, and then at their peripheries by electron beam welding.

Preferably the method includes, (a) providing each cylinder adjacent its said flat end surface with a circumferential flange extending radially of the cylinder, one face of the flange being coplanar with said flat end surface;

(b) providing said face with a groove extending circumferentially relative to the central axis of the cylinder and into the flange in a direction parallel to said axis, the lesser radius of the groove being equal to the outer radius of the cylinder, such that when the cylinders are in end-to-end abutment the grooves cooperate one with the other to provide a circumferential chamber surrounding the juncture of the cylinders;

(c) providing a solid ring metallugically compatible with titanium and adapted to fit within said chamber; and the steps of, (d) placing the solid ring within one said groove;

(e) placing the cylinders in end-to-end abutment so that the groove in the flange on one cylinder cooperates with the groove in the flange on the other cylinder so as to provide a circumferential chamber surrounding the juncture of the cylinders and enclosing therein said solid ring;

(f) placing the abutting cylinders in a vacuum chamber;

(g) evacuating the vacuum chamber so as to remove air from the interface between the cylinders and to evacuate the circumferential chamber;

(h) electron beam welding the cylinders in vacuo at the peripheries of their abutting flanges, whereby the presence of the solid ring within the circumferential chamber prevents the electron beam from extending into the cylinders; and (i) diffusion bonding the cylinders together at their abutting surfaces by hot isostatic pressing.

The method may include a further step of welding the cylinders at their central bore by an inert gas welding process before the cylinders are placed in the vacuum chamber.

Preferably, the hot isostatic pressing is carried out at a temperature of about 940° C. and a pressure of about 103 MPa.

The method preferably includes a final step of removing the flange together with the solid ring enclosed therein after the cylinders have been diffusion bonded.

According to a second aspect of the invention there is provided a titanium fan disc for a gas turbine engine when manufactured according to the method of the first aspect.

Figure 2:
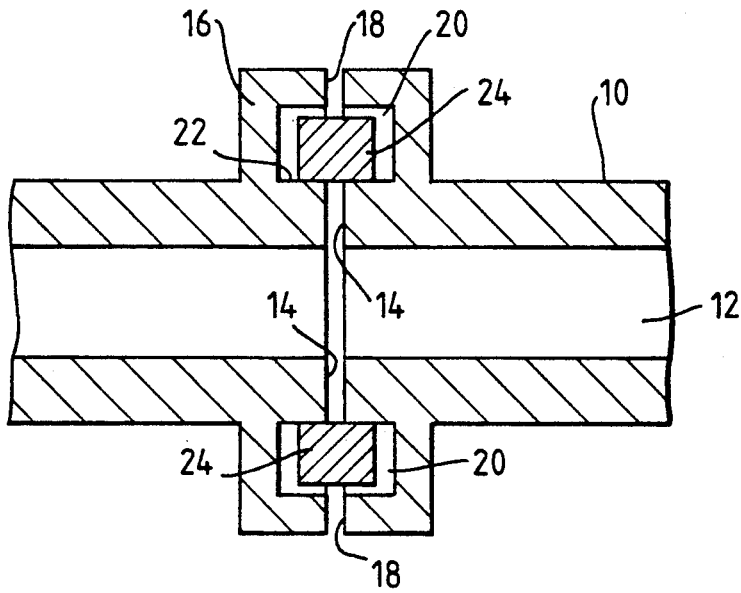
Figure 3:
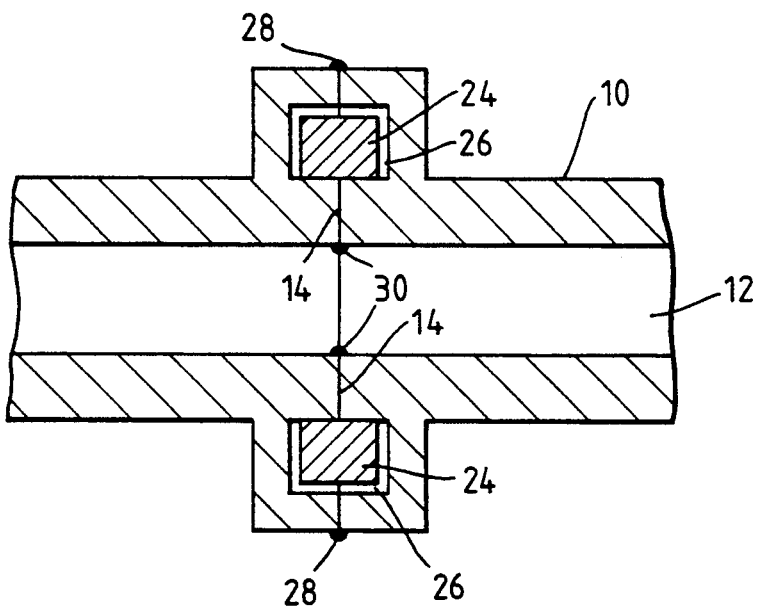
Figure 4:
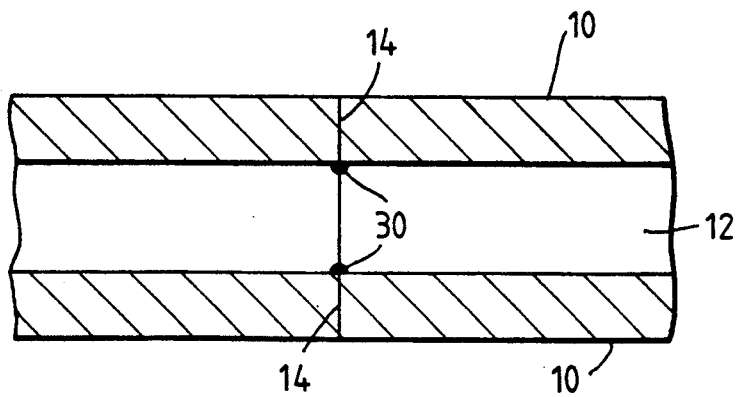
Figure 5:
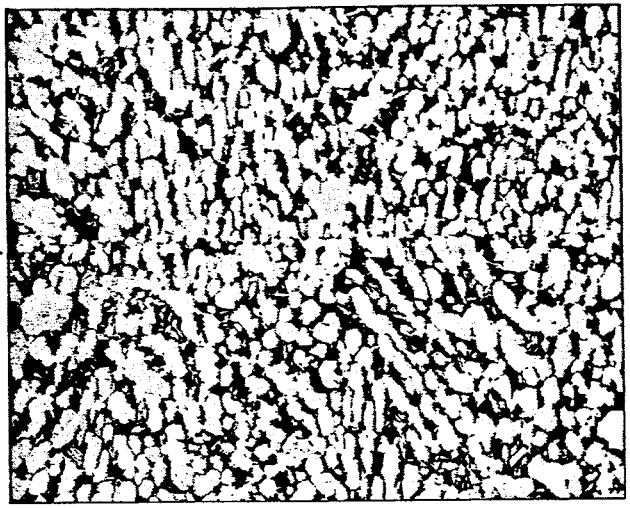
Figure 6:
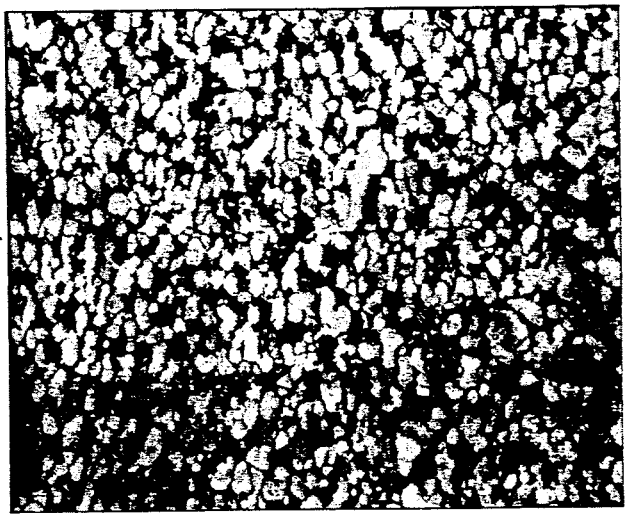

The invention will now be described by way of example only with reference to the accompanying non-scale diagrammatic drawings, in which FIG. 1 is a three-quarters view of a forged titanium cylinder which is a precursor of a fan disc for a gas turbine engine, FIGS. 2-4 are sectional views of two cylinders according to FIG. 1 in successive stages of being joined to form a fan disc, and FIGS. 5 and 6 are microphotographs taken at a linear magnification of ×200 of sections of an interface between two titanium cylinders after the invention has been carried out.

Referring to FIG. 1-4 of the drawings, there is shown a forged titanium cylinder 10 provided with an axial bore 12. The cylinder 10 is provided with a smooth-finished end face 14 at right angles to the axis of the cylinder.

It will be understood that the term "cylinder" in this specification is used to signify a solid consisting of two parallel planes bounded by identical closed curves (circles in this instance) that are interconnected at every point by a set of parallel lines perpendicular to the planes. No implication is intended concerning the ratio of the length of the cylinder to its radius. For instance, if the cylinder is provided with an axial bore it could resemble a ring if the radius is significantly greater than the length.

Referring now in particular to FIGS. 1-3 the cylinder 10 is shown provided at one end with a radially extending circumferential flange 16, the arrangement being that an end face 18 of the flange is coplanar with the end face 14 of the cylinder.

In the end face 18 of the flange 16 there is provided a annular groove 20 machined in a direction parallel to the axis of the cylinder 10. The radius of the radially inner wall 22 of the groove 20 is equal to the radius of the cylinder 10. The inner wall 22 is therefore effectively a cylindrical extension of the surface of the cylinder 10. FIGS. 2 and 3 show two identical cylinders 10 arranged so that the flanges 16 face each other.

Referring now to FIGS. 2 and 3 there is further shown in diametrical section in association with a facing pair of cylinders 10 a titanium ring 24 which, being titanium, is therefore metallurgically compatible with the material of the cylinders. The radial dimensions of the ring 24 are such that it fits within groove 20 in flange 16, and the thickness of the ring is more than the depth of the groove and less than twice the depth of the groove. Hence, the ring 24, when placed in groove 20, will project axially beyond the end face 14 of the cylinder 10, and will be completely enclosed within an annular chamber 26 that is formed by the conjunction of the grooves 16 of two cylinders 10 when the cylinders are placed in end-to-end abutment, as is shown in FIG. 3. It should be observed that the ring 24 is not a tight fit within the groove 20 and there should be appreciable play between the side walls of the ring and the flange 16.

A titanium fan disc for a gas turbine engine is manufactured in accordance with the invention in the following manner.

A pair of identical flanged and grooved cylinders 10 as shown in FIG. 1 are machined out of titanium and the end face 14 and flange end face 18 of each are surface finished and cleaned to a finish better than 1 micron smoothness.

A titanium ring 24, as described above, is placed in the groove 20 of one cylinder 10 and the other cylinder placed in end-to-end juxtaposition so as to provide the annular chamber 26 which now contains the ring (FIGS. 2 and 3).

The cylinders 10 are welded at the inner join in the bore 12 through the cylinders by tungsten inert gas welding to provide an inner seal 30, as shown in FIG. 3. The abutting cylinders 10 are placed in a vacuum chamber which is then evacuated so as to remove air from the interface between the cylinders and to evacuate the annular chamber 26.

The cylinders are then electron beam welded joined at the peripheral join of the flanges 16 in vacuo to provide an outer peripheral seal 28. The titanium ring 24 prevents the electron beam from extending into the body of the cylinders 10 and thereby causing adverse metallurgical defects.

The two cylinders 10 are then removed from the vacuum chamber and are diffusion bonded in ambient atmosphere by hot isostatic pressure techniques at a temperature of 940° C. and pressure of 103 MPa, over a 2 hour cycle.

If the vacuum seal is maintained at the interface between the cylinders 10 (and therefore a vacuum maintained within the annular chamber 26) during the diffusion bonding process the base 32 of one or both flanges will be observed to have collapsed inwards towards the ring 24 at intervals round the flange when the cylinders are removed from the vacuum by virtue of the loose fit of the ring within the annular chamber 26. This is a clear indication that the diffusion bonding has been successful, for it is a prerequisite of successful bonding that the faces should have true metal-to-metal contact. If there is no such collapse then it may be assumed that the initial tungsten inert gas welding and electron beam welding followed by the bonding process have not been entirely successful and that air has leaked into the annular chamber 26.

Viewing of collapse of the flange base 32 may be enhanced by drilling holes in one or both faces of the solid ring 24 prior to insertion in the groove. It will be found under successful bonding that there will be a visible collapse of the flange base 32 into such holes. Finally, if the bonding has been successful, the flanges and the ring 24 are machined off to leave the cylinders 10 bonded together as shown in FIG. 4.

In a metallurgical examination of a test piece that had been subjected to the process of the invention it was found, when the test piece had been sectioned, that the flanges had collapsed entirely onto the solid ring 24 and that it was not possible to distinguish visually the collapsed flanges from the ring. It was further observed under a magnification of ×200 that a section of the test piece at the join between the cylinders near the inner bore exhibited a joint of high integrity with an absence of voiding, and minimal planar boundaries at the joint interface, as shown in FIG. 5. A further section of the test piece at the join between the cylinders in the vicinity of the peripheral region was found to exhibit a good quality interface, with absence of planar boundaries, voids and cracking, as shown in FIG. 6.

We claim:

1. A method of making a titanium fan disc for a gas turbine engine, the method comprising the steps of providing at least first and second forged titanium cylinders, each cylinder having an axial bore and a flat end surface at right angles to the central axis of the cylinder, preparing a said flat end surface of each cylinder to a high degree of smoothness, abutting the prepared surfaces of the cylinders one against the other in axial alignment, removing air from between said surfaces, welding the cylinders together, first at their central bores by inert gas welding, and then at their peripheries by electron beam welding, and diffusion bonding the electron-beam welded cylinders end-to-end by hot isostatic pressing to form the disc.

2. A method as claimed in claim 1 including,
   (a) providing each cylinder adjacent its said flat end surface with a circumferential flange extending radially of the cylinder, one face of the flange being coplanar with said flat end surface;
   (b) providing said face with a groove extending circumferentially relative to the central axis of the cylinder and into the flange in a direction parallel to said axis, the lesser radius of the groove being equal to the outer radius of the cylinder, such that when the cylinders are in end-to-end abutment the grooves cooperate one with the other-to provide a circumferential chamber surrounding the juncture of the cylinders;
(c) providing a solid ring metallurgically compatible with titanium and adapted to fit within said chamber; and the steps of,
(d) placing the solid ring within one said groove;
(e) placing the cylinders in end-to-end abutment so that the groove in the flange on one cylinder cooperates with the groove in the flange on the other cylinder so as to provide a circumferential chamber surrounding the juncture of the cylinders and enclosing therein said solid ring;
(f) placing the abutting cylinders in a vacuum chamber;
(g) evacuating the vacuum chamber so as to remove air from the interface between the cylinders and to evacuate the circumferential chamber;
(h) electron beam welding the cylinders in vacuo at the peripheries of their abutting flanges, whereby the presence of the solid ring within the circumferential chamber prevents the electron beam from extending into the cylinders; and
(i) diffusion bonding the cylinders together at their abutting surfaces by hot isostatic pressing.

3. A method as claimed in claim 2 including a further step of welding the cylinders at their central bore by inert gas welding before the circumferential chamber is evacuated, and prior to electron beam welding the peripheral join of the cylinders.

4. A method as claimed in claim 2 wherein the hot isostatic pressing is carried out at a temperature of about 940° C. and a pressure of about 103 MPa.

5. A method as claimed in claim 2 including a final step of removing the flange together with the solid ring enclosed therein after the cylinders have been diffusion bonded.

* * * * *